(12) United States Patent
Sawhney et al.

(10) Patent No.: US 7,260,274 B2
(45) Date of Patent: Aug. 21, 2007

(54) TECHNIQUES AND SYSTEMS FOR DEVELOPING HIGH-RESOLUTION IMAGERY

(75) Inventors: Harpreet S. Sawhney, West Windsor, NJ (US); Yanlin Guo, Lawrenceville, NJ (US); Rakesh Kumar, Monmouth Junction, NJ (US); Keith J. Hanna, Princeton, NJ (US); James R. Bergen, Hopewell, NJ (US)

(73) Assignee: Imax Corporation (CA)

( * ) Notice: Subject to any disclaimer, the term of this patent is extended or adjusted under 35 U.S.C. 154(b) by 431 days.

(21) Appl. No.: 10/433,338

(22) PCT Filed: Nov. 30, 2001

(86) PCT No.: PCT/US01/44995

§ 371 (c)(1),
(2), (4) Date: Mar. 3, 2004

(87) PCT Pub. No.: WO02/45003

PCT Pub. Date: Jun. 6, 2002

(65) Prior Publication Data

US 2004/0151401 A1   Aug. 5, 2004

Related U.S. Application Data

(60) Provisional application No. 60/250,732, filed on Dec. 1, 2000.

(51) Int. Cl.
  *G06K 9/36* (2006.01)
  *G06K 9/40* (2006.01)
  *H04N 13/02* (2006.01)
(52) U.S. Cl. .................. 382/284; 382/254; 382/299; 382/312; 348/47

(58) Field of Classification Search ............... 382/154, 382/254, 294–300, 107, 318, 151, 176, 174, 382/240, 278, 284, 312; 345/419–420, 613; 348/42, 47; 358/1.2; 375/240.19
See application file for complete search history.

(56) References Cited

U.S. PATENT DOCUMENTS 5,259,040 A   11/1993   Hanna (Continued)

FOREIGN PATENT DOCUMENTS

JP   060102484   4/1994

(Continued)

OTHER PUBLICATIONS

Harpreet S. Sawhney, "3D Geometry from Planar Parallax", In Proc. IEEE Computer Vision and Pattern Recognition Conference, Seattle, WA, Jun. 21-23, 1994.

(Continued)

*Primary Examiner*—Kanjibhai Patel
(74) *Attorney, Agent, or Firm*—Kilpatrick Stockton LLP

(57) ABSTRACT

Systems and techniques for synthesizing high-resolution images are described. Using as input hybrid high- and low-resolution images (110, 120), processing techniques including three-dimensional image warp-based (160) rendering may assist in developing the high-resolution output images. Enhanced results may in some instances be obtained by creating a high-resolution images of one member of a pair of stereo images by utilizing multiple frames of the other member of the pair.

7 Claims, 2 Drawing Sheets

U.S. PATENT DOCUMENTS

| | | | |
|---|---|---|---|
| 5,325,449 | A | 6/1994 | Burt et al. |
| 5,488,674 | A | 1/1996 | Burt et al. |
| 5,589,852 | A | 12/1996 | Thompson et al. |
| 5,629,988 | A | 5/1997 | Burt et al. |
| 5,649,032 | A | 7/1997 | Burt et al. |
| 5,694,491 | A | 12/1997 | Brill et al. |
| 5,719,966 | A | 2/1998 | Brill et al. |
| 5,738,430 | A | 4/1998 | Brill |
| 5,909,516 | A | 6/1999 | Lubin |
| 5,946,041 | A | 8/1999 | Morita |
| 5,963,664 | A | 10/1999 | Kumar et al. |
| 5,974,159 | A | 10/1999 | Lubin et al. |
| 6,061,477 | A | 5/2000 | Lohmeyer et al. |
| 6,072,907 | A | 6/2000 | Taylor et al. |
| 6,075,884 | A | 6/2000 | Lubin et al. |
| 6,130,660 | A | 10/2000 | Imsand |
| 6,137,904 | A | 10/2000 | Lubin et al. |
| 6,141,459 | A | 10/2000 | Gendel |
| 6,219,462 | B1 | 4/2001 | Anandan et al. |
| 6,269,175 | B1 * | 7/2001 | Hanna et al. ............... 382/107 |
| 6,487,304 | B1 * | 11/2002 | Szeliski ...................... 382/107 |
| 6,522,787 | B1 | 2/2003 | Kumar et al. |
| 6,573,912 | B1 * | 6/2003 | Suzuki et al. ............... 715/757 |
| 6,806,898 | B1 * | 10/2004 | Toyama et al. .......... 348/14.16 |

FOREIGN PATENT DOCUMENTS

| | | |
|---|---|---|
| WO | WO93/07585 | 4/1993 |
| WO | WO93/23823 | 11/1993 |
| WO | WO96/15508 | 5/1996 |
| WO | WO97/01135 | 1/1997 |
| WO | WO97/37323 | 10/1997 |
| WO | WO98/02844 | 1/1998 |
| WO | WO98/21690 | 5/1998 |
| WO | WO 00/13423 | 3/2000 |
| WO | WO02/03687 | 1/2002 |
| WO | WO 02/45003 A1 | 6/2002 |

OTHER PUBLICATIONS

P.J. Burt and E.H. Adelson, "The Laplacian Pyramid as a Compact Image Code", IEEE Transactions on Communications, vol. 31 (4), pp. 532-540, 1983.

R. Kumar et al. "Representation of scenes from collection of images", In Proc. IEEE Wkshp. on Representation of Visual Scenes, Cambridge, MA 1995.

K.J. Hanna. "Direct multi-resolution estimation of ego—motion and structure from motion". In Proceedings IEEE Workshop on Visual Motion, Nassau Inn, Princeton, New Jersey, Oct. 7-9, 1991, pp. 156-162.

K.J. Hanna and Neil E. Okamoto. "Combining stereo and motion analysis for direct estimation of scene structure". In Proceedings IEEE International Conference on Computer Vision, Berlin, Germany, pp. 357-365, May 11-14, 1993.

J.R. Bergen, P. Anandan, R. Hingorani and K. Hanna. "Hierarchical model—based motion estimation". In Proceedings $2^{nd}$ European Conference on Computer vision, pp. 237-252, 1992.

G. Healey and D. Slater, "Global Color Constancy: Recognition of objects by use of illumination invariant properties of color distributions," Journal of the Optical Society of America A, 11(11):3003-3010, Nov. 1994.

D. Slater and G. Healey. "The Illumination-Invariant Recognition of 3-D Objects Using Local Color Invariants," IEEE Transactions on Pattern Analysis and Machine Intelligence, 18(2):206-210, Feb. 1996.

International Search Report in related Application No. PCT/US01/44995.

* cited by examiner

TECHNIQUES AND SYSTEMS FOR DEVELOPING HIGH-RESOLUTION IMAGERY

REFERENCE TO PROVISIONAL APPLICATION

This application is based on and hereby refers to U.S. Provisional Patent Application Ser. No. 60/250,732, filed Dec. 1, 2000, having the same title as appears above.

FIELD OF THE INVENTION

This invention relates to techniques and systems for developing, and in particular synthesizing, high-resolution imagery. Exemplary techniques are designed to accommodate input from one high-resolution (film or digital) camera and one lower-resolution (digital) camera yet provide high-resolution stereo images as output. The techniques and systems of the invention are not so limited, however, and instead may be scaled or otherwise employed to achieve desired results regardless of the number of film or digital cameras (or other equipment) utilized.

BACKGROUND OF THE INVENTION

International Patent Application No. PCT/US99/19706, published Mar. 9, 2000 as WO 00/13423 and incorporated herein in its entirety by this reference, discloses apparatus and methods for transforming imagery recorded by one camera into other imagery that differs from the first imagery, using imagery collected by one or more additional cameras that differ in their characteristics or parameters from the first camera See Abstract, 11. 1-3. As described in the application, high-resolution image data from a high-resolution camera is warped using lower-resolution data (from a separate lower-resolution camera) to synthesize a high-resolution image having the viewpoint of the lower-resolution camera. See, e.g., id. at 11. 4-6. The original high-resolution image data and synthetic image can then be used to form a high-resolution stereo image, notwithstanding that only one high-resolution camera is employed. See id. at p. 2, 11. 23-30.

SUMMARY OF THE INVENTION

The present invention provides further systems and techniques for achieving these and other high-visual-quality synthetic high-resolution images. Among concepts utilized by the invention is that of spatio-temporal processing of hybrid-resolution input with three-dimensional parameterization. Because each left-right pair of a sequence of stereo frames can be captured at the same time instant, correspondence between the members of the pair at the lower resolution can be established using three-dimensional rigidity as a constraint for the scene and the cameras. The correspondence map derived at the lower resolution can be projected to represent the correspondence map at the higher, or finer, resolution. Using three-dimensional image warp-based rendering, a high-resolution image of one member of a pair can be created using the full-resolution image of the other pair member and the full-resolution correspondence map.

For enhanced synthesis, furthermore, the high-resolution image of one member of the pair may be created utilizing multiple frames of the full-resolution image of the other pair member. These multiple frames typically are contained within a small temporal window around the first member of the pair, and correspondence maps are computed using both spatial and temporal processing. In some embodiments of the invention, adaptive temporal techniques that can use a variable number of temporal frames for different parts of a synthesized frame (based on an estimate of the magnitude of motion between frames) may be employed.

Solutions to alignment issues and various mismatch artifacts caused by use of multiple cameras also form part of the present invention. Up-sampled and sharpened lower-resolution images, for example, can be used to fill in selected areas of mismatch. Linear color correction also is applied when appropriate, with locally-adaptive color correction models available for use.

It thus is an object of the present invention to provide systems and techniques for synthesizing high-resolution images.

It is a further object of the present invention to provide systems and techniques for creating high-resolution stereo images using less than two high-resolution cameras.

It is another object of the present invention to provide spatio-temporal processing techniques for hybrid-resolution input.

It is also an object of the present invention to provide techniques for creating a high-resolution image of one member of a pair of images utilizing multiple frames of the other image of the pair.

It is yet another object of the present invention to provide movies utilizing images synthesized from, at least in part, lower-resolution images.

Other objects, features, and advantages of the present invention will be apparent with reference to the remainder of the text and the drawings of this application.

DETAILED DESCRIPTION

Figure 1:
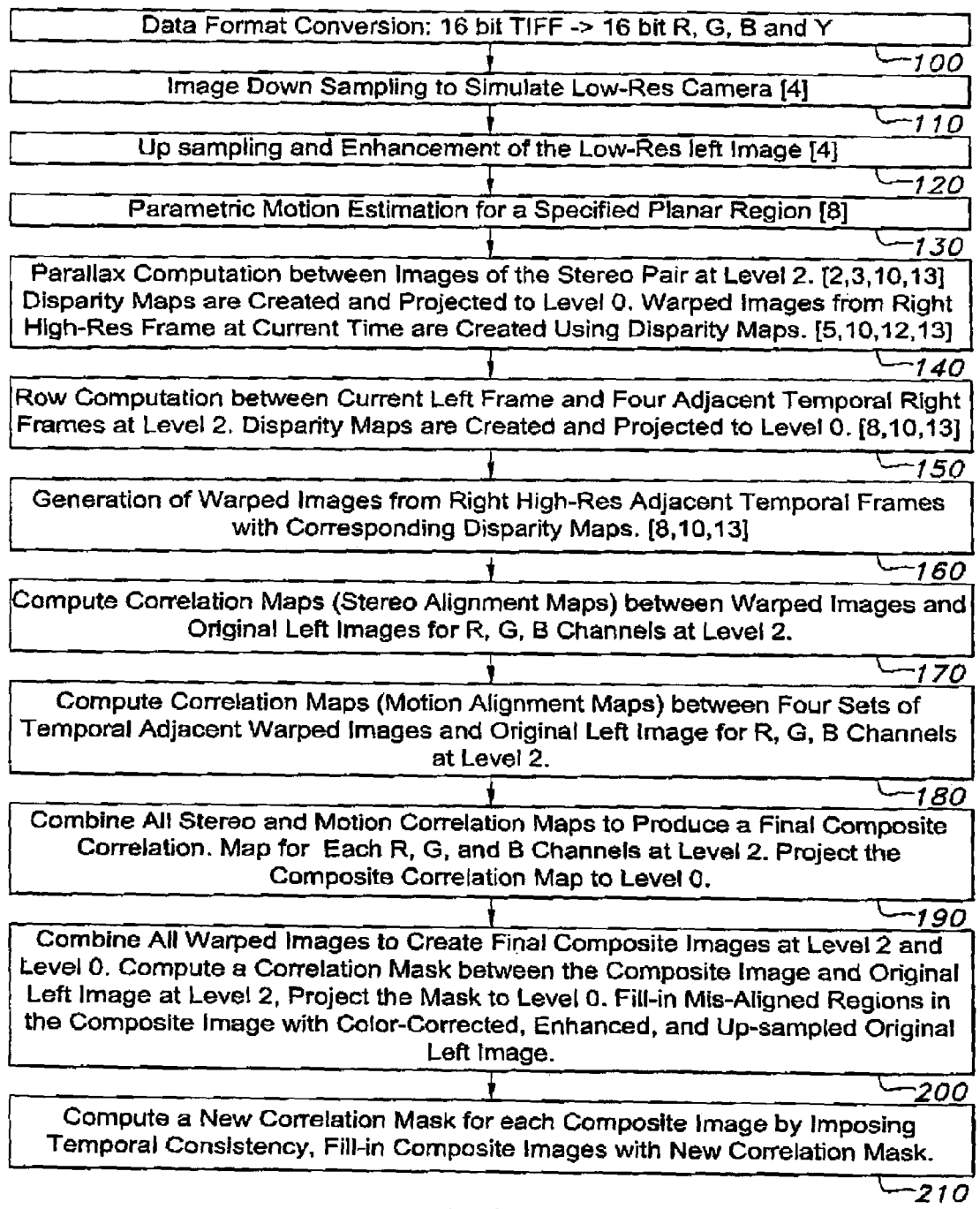
FIG. 1 is a flow chart detailing various actions, some or all of which may occur in connection with the invention.

Shown in FIG. 1 is a flow chart describing exemplary actions which may (but need not necessarily always) constitute part of the invention. The chart details the overall process of synthesizing one high-resolution (nominally "left") image from a hybrid-resolution stereo image pair comprising a lower-resolution left image and a corresponding high-resolution "right" image together with its temporally-adjacent frames. Those skilled in the art will recognize that the synthesized image need not necessarily be a "left"-hand image, as the terms "left" and "right" are used merely for convenience of description. Skilled artisans likewise will understand that the synthesis need not always utilize frames temporarily-adjacent each high-resolution image, although doing so often may be advantageous.

Block 100 of FIG. 1 references optional data format conversion into R, G, B, and Y sixteen-bit short images which may occur if, for example, a sixteen-bit TIF image sequence (6144×4592 pixel resolution) from a high-resolution camera is provided as base input. Such conversion often may be useful when the individual R, G, B, and Y components are utilized extensively in the synthesis, although is not absolutely required. (Of course, if base input already is formatted in this manner, the actions of block 100 likewise would not be necessary.)

Typically, a second set of images (the "left" images) will be obtained or derived from a lower-resolution digital camera or device. However, if necessary to simulate such lower-resolution images from those of block 100, the action of block 110 may be employed. As shown in block 110, the high-resolution image of block 100 may be sub-sampled to provide lower-resolution images (e.g. 1536×1148 pixels) simulating those available from a digital camera. Pyramid processing preferentially may, but need not necessarily, be employed to effect the sub-sampling, and the lower-resolution images preferably (but again not necessarily) will be one-quarter by one-quarter the size of the original frames and at pyramid level 2.

Block 120 addresses actions to be taken in connection with the lower-resolution left images. After the high-resolution left image has been synthesized, mis-matched regions in the synthesized image usually will need to be filled in with corresponding portions of the original (lower-resolution) left image. Consequently, as shown in block 120, the original left image may be up-sampled to full resolution (and then enhanced through existing techniques if appropriate) thereafter to permit its use for filling-in the mis-matched regions.

Suitably estimating correspondence maps (both for left-right stereo processing and left-right processing from temporily non-identical frames) is one of many novel aspects of the invention. One approach to doing so involves employing all constraints between a set of frames to compute a vector field that presents the correspondence of interest. For a stereo left-right pair, for example, constraints include (1) three-dimensional rigidity, so that the vector field is parameterized using relative camera poses, and (2) the relative depth/parallax of each point. The camera poses may be represented in Euclidean terms as the internal calibration parameters of the cameras, as well as exterior poses in terms of relative rotation and translation. Because only image synthesis (as opposed to absolute three-dimensional estimates) are necessary, an alternate representation of three-dimensional geometry known as "plane plus parallax" may be used.

Utilizing plane-plus-parallax representation allows computation of correspondence maps without mandating that the cameras be calibrated. Instead, a surface in the scene of the image (a planar surface, for instance), is used to establish the reference frame between the two cameras. The three-dimensional shape is then computed with respect to the reference frame to obtain the correspondence maps. Thus, computations of both planar and three-dimensional pose and shape transformations are made when this representation scheme is employed.

For frames separated in time, three-dimensional rigidity typically is not used as a constraint, as independently moving objects may be present in the scenes. Instead, correspondence maps may be established through computation of optical flow. In order to seed the optical flow, a parametric global transformation like the one used for plane-plus-parallax representation may be employed.

For both the plan-plus-parallax and optical flow processes, planar parametric motion estimation (block 130) is appropriate. Since this computation depends on the relationship between the two input images, it is made at the available highest common spatial resolution (typically that of the lower-resolution images or at pyramid level 2). A planar region may be specified as a rectangular window in the coordinate of the left frame, and the plane aligned between the left and right frames at level 2 using existing methods described in, for example, J. R. Bergen, P. Anandan, R. Hingorani and K. Hanna, "Hierarchical model-based motion estimation," *Proceedings 2nd European Conference on Computer Vision*, pp. 237-252 (1992).

Using the planar alignment between the left and right frames, a disparity/correspondence map between the two may be computed (block 140) using plane-plus-parallax alignment at the lower resolution (i.e. that of the left image). The correspondence map between two frames preferably is parameterized by multiple parameters for the relative pose between the cameras and by one parameter per pixel for the relative shape, although other numbers of parameters may be used instead. Algorithms employed to create the map may utilize coarse-to-fine recursive estimation processes with multi-resolution image pyramid representation, beginning estimation of image displacements at reduced resolution and then refining the estimates through repeated warping and residual displacement estimation techniques at successively finer resolution levels. An advantage of this estimation approach is that it provides efficient computation even when large displacements are present yet also provides sub-pixel accuracy in displacement estimates.

As noted earlier, optical flow may be used to establish correspondence between a left frame and a right frame displaced in time (as referenced in block 150). Optical flow also starts with a global parametric planar motion estimation and then employs a coarse-to-fine iterative alignment technique akin to that used for plane-plus-parallax processing. The principal relevant difference between the techniques is that correspondence between the temporily-differentiated frames is described as a two-parameter vector rather than a one-parameter parallax estimate.

Once the parallax field has been estimated, it can be used to produce a high-resolution synthesized view. For each pixel of the to-be-synthesized image, a displacement vector specifying a location in the source image will be accessed, the pixels in a selected neighborhood of the specified location will be accessed and, based on those pixels, an interpolated value for the synthesized pixel will be calculated. This operation may be performed at the full target image resolution and for each of the R, G, and B channels. Also, to preserve the desired image quality in the synthesized image, the interpolation step may be done using at least a bi-cubic interpolation function with a fast, high-quality warper. Likewise, with optical flow the sets of R, G, and B right temporal adjacent frames (typically but not necessarily two previous and two subsequent frames) at level 0 are warped to the coordinate system of the left frame using the corresponding flow at level 0 fields.

Errors in the computed correspondence maps (due to factors such as occlusion, rapid depth transition, thin structures in the scene, etc.) can affect image alignment quality. Some embodiments of the invention counteract these errors by accurately detecting misaligned regions, removing the detected regions, and blending in information either from lower-resolution imagery, adjacent regions in the image, or adjacent temporal frames.

Detection of mismatched images may occur by warping the R, G, and B right frames at level 2 to the coordinate system of the corresponding left frame using the disparity map computed at level 2. See Block 160. Thereafter, a normalized correlation-like measure is computed between each of the original R, G, and B left frames and the warped ones at level 2. These correlation maps, called "stereo alignment maps" in block 170, may be projected from level 2 to level 0 for each of the color channels.

Similarly, the (four) sets of adjacent temporal right R, G, and B frames may be warped at level 2 to the coordinate system of the current left frame using the optical flow maps computed at the same level. The normalized correlation maps are computed between the original R, G, and B left frames and the warped ones at level2. The correlation maps, called "motion alignment maps" in block 180, are projected from level 2 to level 0 for each of the R, G, and B channels.

With all correlation maps (one stereo alignment map and four motion alignment maps for each color channel) at level 2, and using the corresponding five sets of warped R, G, and B images, a synthesized left image for each channel may be created. In some embodiments of the invention, the synthesized image is the weighted average of the five warped images (with the corresponding correlation values being the weights). A correlation map representing the similarity of the composite and original left images may also be created at level 2 for each color channel. The R, G, and B composite correlation maps are projected from level 2 to level 0, indicating the alignment quality of the final synthesized left image at the high resolution. See Block 190.

Temporal processing of time-separate frames may be performed using a fixed window. Alternatively, an adaptive technique using windows of variable frame width (0 to N), based on the magnitude of motion present in regions of a frame, may be employed. This latter technique allows handling of widely-varying magnitudes of motion corresponding to different object and background motions.

For example, in the well known "Redcar" sequence, the motion of the lady dressed in black in the foreground is much larger than the motion of the remainder of the scene. Thus, advantages can be realized if the temporal support region used for the region including her is smaller than that used for regions with less motion. The adaptive technique uses the optical flow computation to divide the reference frame into regions of different magnitudes of motion by dividing the flame into "buckets" representing various magnitudes. Connected components of regions defined using this bucketing provides regions with labels corresponding to different magnitudes. In the compositing phase, the number of frames composited based on the region label can be varied: regions with very large motion often use only stereo processing that has a zero-width temporal window, while regions with medium motion use a window of +/− one frame and regions of small motion use a window of +/− two frames. Those skilled in the art will, however, recognize that the specific parameters and window sizes can easily differ as appropriate or desired.

Block 200 refers to filling-in misaligned regions in the composite image. By using the projected stereo and motion alignment maps at level 0, the R, G, and B left frames are synthesized. To perform the same combination for all three color channels, a single composite correlation map may be created at level 0 by combining the R, G, and B composite alignment maps. Based on the final composite correlation mask, the misaligned regions in the composite high-resolution left image may be filled in with the information from the corresponding low-resolution image (which is up-sampled and, if appropriate, enhanced as indicated in block 120).

Any color mis-match also may be computed and corrected for the up-sampled image with respect to the composite image. In the color correction method, only pixels that are well aligned are used to compute a color-transformation model, which may then be applied to correct color mismatch for the misaligned pixels. Finally, misaligned pixels in the composite image may be filled in with the color-corrected, up-sampled, and enhanced original left image. Additionally, regions of color mismatch between the original and up-sampled pixels may be corrected using a locally adaptive color correction technique that operates only on a window located at the mismatched region rather than using a global color correction process.

The frames synthesized with multi-frame processing and color correction may exhibit temporal scintillation if the filled-in regions are not correlated over time. The sliding-window-based temporal processing technique largely maintains correlated artifacts over time between the synthesized frames since the new information brought in by the sliding window is relatively small. However, at least some temporal scintillation artifacts might remain for handling. As a result, an optional processing action of the invention can include refining the output images to reduce the artifacts in the final synthesized frames due to temporarily inconsistent filling-in of up-sampled low-resolution images.

In the optional refining step, each of the final composite correlation maps for the (e.g. three or five) temporally-adjacent frames is aligned with respect to the final composite correlation map at level 2. The warped and current correlation maps may be combined to produce a new correlation mask for the current frame, as noted in block 210. The new correlation masks may be temporarily correlated, thereby improving temporal consistency in the filling-in process. These new correlation masks may also be projected from level 2 to level 0 and used to correct color mismatches in the up-sampled and enhanced original left image. The misaligned pixels in the composite image are then filled in from the color-corrected and up-sampled left image with the new composite masks.

Figure 2:
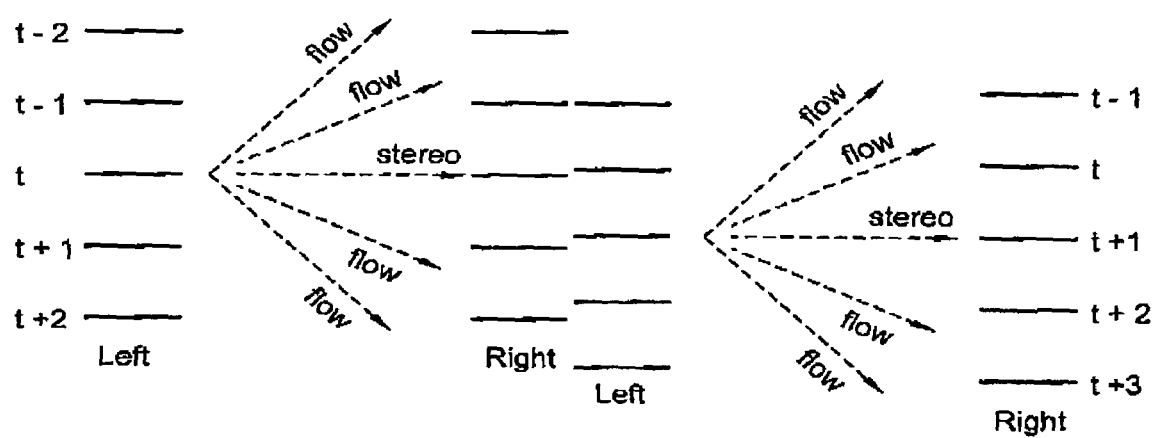
FIG. 2 is a chart showing exemplary stereo-motion sequence processing useful as part of the invention.

FIG. 2 presents a stylized depiction of the stereo-motion processing within a moving window of frames. In the particular embodiment illustrated in FIG. 2, a window of up to two frames in the past and future (with respect to the present frame) may be used to synthesize the current high-resolution left frame. The invention is, however, not limited to the depiction of FIG. 2, but rather may utilize fewer or more temporily-adjacent frames whenever appropriate or desired.

The foregoing has been provided for purposes of illustrating, explaining, and describing embodiments of the present invention, significant portions of which may be implemented through software, hardware, or both. Further modifications and adaptations to these embodiments will be apparent to those skilled in the art and may be made without departing from the scope or spirit of the invention. Applicants additionally incorporate by reference herein the entire contents of each of the references below:

[1] "Synthesizing Large Format Stereo Images Using a Hybrid Digital/Film Stereo Camera with JND-based Evaluation Tools", Sarnoff Corp. Proposal #98-12408-1-233-2, October, 1998.

[2] R. Kumar, P. Anandan, and K. Hanna. "Direct recovery of shape from multiple views: A parallax based approach". In International Conference on Pattern Recognition, pages 685-688, 1994.

[3] Harpreet S. Sawhney, "3D Geometry from Planar Parallax", In Proc. IEEE Computer Vision and Pattern Recognition Conference, Seattle, Wash., 1994.

[4] P. J. Burt and E. H. Adelson, "The Laplacian Pyramid as a Compact Image Code", IEEE Transactions on Communications, vol. 31 (4), pp. 532-540, 1983.

[5] R. Kumar et al. "Representation of scenes from collection of images", In Proc. IEEE Wkshp. on Representation of Visual Scenes, Cambridge, Mass. 1995.

[6] K. J. Hanna. "Direct multi-resolution estimation of ego—motion and structure from motion". In Proceedings IEEE Workshop on Visual Motion, pages 156-162, 1991.

[7] K. J. Hanna and Neil E. Okamoto. "Combining stereo and motion analysis for direct estimation of scene structure". In Proceedings IEEE International Conference on Computer Vision, pages 357-365, 1993.

[8] J. R. Bergen, P. Anandan, R. Hingorani and K. Hanna. "Hierarchical model-based motion estimation". In Proceedings $2^{nd}$ European Conference on Computer vision, pages 237-252, 1992.

[9] "Method and Apparatus for Synthesizing High-Resolution Imagery using One High-resolution Camera and a Lower Resolution Camera", Sarnoff Corp., Patent Pending application Ser. Nos. 09/384,396, 99/19706.

[10] "Method for determining sensor motion and scene structure and image processing system thereof", Hanna, K. J., Sarnoff Corp. U.S. Pat. No. 5,259,040.

[11] "Method and system for image combination using a parallax-based technique", Anandan, P. et al., Sarnoff Corp. U.S. Pat. No. 5,963,664.

[12] "Method and apparatus for processing images", Hanna, K. J., et al., Sarnoff Corp. patent application Ser. Nos. 09/384,118, 99/19705.

[13] "Method and apparatus for synthesizing new video and/or still imagery from a collection of real video and/or still imagery", Kumar, R, Sawhney, H. S. and Hanna, K. J., Sarnoff Corp. Patent App. No. 60/158,468.

[14] G. Healey and D. Slater, "Global Color Constancy: Recognition of objects by use of illumination invariant properties of color distributions," Journal of the Optical Society of America A, 11(11):3003-3010, November, 1994.

[15] D. Slater and G. Healey. "Recognizing 3-D Objects using Local Color Invariants," IEEE Transactions on Pattern Analysis and Machine Intelligence, 18(2):206-210, February, 1996.

[16] "Computationally Efficient Digital Image Warping", Burt, P. J., Lohmeyer, M. S., and Van der Wal, G. S., Sarnoff Corp. U.S. Pat. No. 6,061,477.

What is claimed is:

1. A method for synthesizing a high resolution image comprising:
   receiving a sequence pair of images comprising a first image of a low resolution taken from a first camera and a second image of a high resolution taken from a second camera;
   receiving a plurality of images temporally adjacent to the second image, the plurality of images being of a high resolution and taken from the second camera;
   computing stereo correspondence maps between the first image and the second image;
   computing temporal correspondence maps between the first image and each of the plurality of images; and
   computing a composite high resolution version of the first image using the stereo correspondence maps and the temporal correspondence maps.

2. The method of claim 1, wherein the first image comprises a coordinate system, the method further comprising:
   warping the second image to the coordinate system;
   computing stereo alignment maps between the warped second image and the first image;
   warping the plurality of images to the coordinate system;
   computing motion alignment maps between of the warped plurality of images and the first image;
   producing a composite correlation map by combining the stereo alignment maps and the motion alignment maps; and
   projecting the composite correlation map to the high resolution of the second image.

3. The method of claim 2, wherein the composite high resolution version of the first image comprises mis-aligned regions, the method further comprising:
   filling the mis-aligned regions based on the composite correlation map.

4. The method of claim 3, further comprising filling the mis-aligned regions with a color-corrected, enhanced, up-sampled first image.

5. The method of claim 4, further comprising color-correcting the first image using a local adaptive color correction technique.

6. The method of claim 1, further comprising:
   computing a new correlation mask for each composite image by imposing temporal consistency; and
   filling composite images using the new correlation masks.

7. A method for synthesizing a high resolution image comprising:
   receiving a sequence pair comprising a first image of a low resolution taken from a first camera and a second image of a high resolution taken from a second camera;
   receiving a third image and a fourth image temporally adjacent to the second image, the third and fourth image being of a high resolution and taken from the second camera;
   up-sampling the first image to full resolution;
   applying image enhancement to the up-sampled image;
   computing a planar parametric motion estimation for a specified planar region in the images to determine a planar alignment between the first image and the second image;
   using the planar alignment in computing a correspondence map between the first image and the second image using plane-plus-parallax alignment at the low resolution of the first image;
   establishing a correspondence between the first image, the second image, the third image and the fourth image that is displaced in rime by using optical flow;
   generating warped images from the second image, the third image and the fourth image using the correspondence map;
   computing stereo alignment maps between the warped images and the first image for color channels at a pyramid level 2;
   computing motion alignment maps between the third and fourth image and the first image for the color channels at pyramid level 2;
   combining all maps to produce a composite correlation map for each of the color channels at pyramid level 2;
   projecting the composite correlation map to pyramid level 0;
   combining all warped images to create a final composite image at pyramid level 2 and pyramid level 0;
   computing a correlation mask between the composite image and the first image at pyramid level 2 and project the mask to pyramid level 0; and
   fill in mis-aligned regions in the composite image with the color corrected, enhanced, and up-sampled first image.

* * * * *